（12）United States Patent
Sundararajan et al.

(10) Patent No.: US 10,672,385 B2
(45) Date of Patent: Jun. 2, 2020

(54) METHOD AND SYSTEM FOR REMOTELY TRAINING AND COMMANDING THE SPEECH RECOGNITION SYSTEM ON A COCKPIT VIA A CARRY-ON-DEVICE IN A CONNECTED AIRCRAFT

(71) Applicant: Honeywell International Inc., Morristown, NJ (US)

(72) Inventors: Bharath Sundararajan, Trichy (IN); Vasantha Selvi Paulraj, Bangalore (IN); Rengarajan Mohan, Madurai (IN)

(73) Assignee: Honeywell International Inc., Morris Plains, NJ (US)

( * ) Notice: Subject to any disclaimer, the term of this patent is extended or adjusted under 35 U.S.C. 154(b) by 374 days.

(21) Appl. No.: 14/845,520

(22) Filed: Sep. 4, 2015

(65) Prior Publication Data

US 2017/0069312 A1   Mar. 9, 2017

(51) Int. Cl.
*G10L 15/00* (2013.01)
*G10L 15/07* (2013.01)
(Continued)

(52) U.S. Cl.
CPC .............. *G10L 15/07* (2013.01); *G10L 15/02* (2013.01); *G10L 25/72* (2013.01); *G10L 15/063* (2013.01); *G10L 15/065* (2013.01); *G10L 15/20* (2013.01); *G10L 15/22* (2013.01); *G10L 2015/0636* (2013.01)

(58) Field of Classification Search
CPC ....... G10L 15/22; G10L 15/30; G10L 15/265; G10L 15/20; G10L 15/02; G10L 15/08; G10L 15/063; G10L 15/065; G10L 15/07; G10L 15/183; G10L 15/197; G10L 17/005; G10L 17/02; G10L 2015/0631;
(Continued)

(56) References Cited

U.S. PATENT DOCUMENTS 6,839,670 B1 * 1/2005 Stammler ............. G10L 15/063
704/251
7,774,202 B2   8/2010 Spengler et al.
(Continued)

FOREIGN PATENT DOCUMENTS

EP          2405422          1/2012

OTHER PUBLICATIONS

European Patent Office, "Extended European Search Report from EP Application No. 16186190.1, dated Jan. 30, 2017", "from Foreign Counterpart of U.S. Appl. No. 14/845,520", filed Jan. 30, 2017, pp. 1-8, Published in: EP.
(Continued)

*Primary Examiner* — Vu B Hang (57) ABSTRACT

A method for implementing a speaker-independent speech recognition system with reduced latency is provided. The method includes capturing voice data at a carry-on-device from a user during a pre-flight check-in performed by the user for an upcoming flight; extracting features associated with the user from the captured voice data at the carry-on-device; uplinking the extracted features to the speaker-independent speech recognition system onboard the aircraft; and adapting the extracted features with an acoustic feature model of the speaker-independent speech recognition system.

20 Claims, 6 Drawing Sheets

(51) Int. Cl.
*G10L 15/02* (2006.01)
*G10L 25/72* (2013.01)
*G10L 15/22* (2006.01)
*G10L 15/20* (2006.01)
*G10L 15/06* (2013.01)
*G10L 15/065* (2013.01)

(58) Field of Classification Search
CPC ....... G10L 25/78; G10L 15/187; G10L 17/04; G10L 17/06
USPC ....... 704/231, 233, 236, 243, 244, 246, 250, 704/255, 270
See application file for complete search history.

(56) References Cited

U.S. PATENT DOCUMENTS

| | | | |
|---|---|---|---|
| 8,370,157 B2* | 2/2013 | Boregowda | G10L 15/063 704/226 |
| 8,554,559 B1 | 10/2013 | Aleksic et al. | |
| 2002/0138274 A1* | 9/2002 | Sharma | G10L 15/065 704/270 |
| 2010/0178956 A1 | 7/2010 | Safadi | |
| 2010/0312560 A1 | 12/2010 | Ljolje et al. | |
| 2012/0232902 A1 | 9/2012 | Bocchieri et al. | |
| 2013/0185070 A1* | 7/2013 | Huo | G10L 15/063 704/243 |
| 2016/0019912 A1* | 1/2016 | Barillaud | G10L 25/48 704/224 |

OTHER PUBLICATIONS

Ronzhin et al., "Survey of Russion Speech Recognition Systems", Jun. 25-29, 2006, pp. 54-60, Publisher: SPECOM'2006, Published in: RU.

European Patent Office, "Communication Pursuant to Article 94(3) for EP Application No. 16186190.1", Foreign Counterpart to U.S. Appl. No. 14/845,520, dated Apr. 13, 2018, pp. 1-9, Published in: EP.

* cited by examiner

METHOD AND SYSTEM FOR REMOTELY TRAINING AND COMMANDING THE SPEECH RECOGNITION SYSTEM ON A COCKPIT VIA A CARRY-ON-DEVICE IN A CONNECTED AIRCRAFT

BACKGROUND

Current speech recognition systems require a training session for a user. In the currently available speech recognition technology, a well trained speaker-independent model yields an accuracy of 90-93%. Improving the accuracy from 93% to 98% is challenging.

The speech enabled cockpit is designed to recognize the voices of the pilot and co-pilot in the cockpit. Extensive research has been carried out to enable and improve speech recognition in the cockpit of an aircraft, which typically has a high level of background noise. There are currently two methods to improve accuracy of the speech recognition technology in the cockpit. One method uses offline training for every pilot and co-pilot. This is a costly, laborious, time intensive process that requires a pilot to dedicate many hours to take a tutorial and create a personal voice profile. Another method implements real-time training as the pilot, sitting in the cockpit, uses the speech recognition system before and during a flight.

This latter training technique introduces latency and often requires additional processing and memory. In this latter training technique, during the voice practice, there is often background noise inside the cockpit and/or outside the aircraft environment. Currently available systems correct for some of the background noise from the cockpit when the pilot is initiating a voice command with the on-board systems. However, the current technology for noise correction still has several problems.

SUMMARY

The present application relates to a method for implementing a speaker-independent speech recognition system with reduced latency. The method includes capturing voice data at a carry-on-device from a user during a pre-flight check-in performed by the user for an upcoming flight; extracting features associated with the user from the captured voice data at the carry-on-device; uplinking the extracted features to the speaker-independent speech recognition system onboard the aircraft; and adapting the extracted features with an acoustic feature model of the speaker-independent speech recognition system.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments of the methods and systems described below resolve the above mentioned problems by offloading a training process for a speaker-independent speech recognition system onboard the aircraft to a separate carry-on-device (COD). The COD incorporates and enables a speech recognition system adaptation for a speech-based-cockpit system while simultaneously allowing the pilot to command the cockpit systems remotely through speech in an off-board preflight check. The COD, which the pilot and co-pilot use to perform pre-flight check-in for an upcoming flight, provides a method to adapt the speaker independent speech recognition system with a specific user voice (e.g., the pilot's voice) for higher accuracy. The acoustic model residing within the cockpit system is speaker independent and adapts to the existing speech recognition model to the speech of the pilot or co-pilot to provide a more easily implemented method to adapt the speech models for a user. This saves additional costs over prior art systems that require hardware changes in the cockpit to implement a prior art real-time training feature in the cockpit. The methods and systems described herein reduce the latency of the prior art, complex, real-time training of models while improving performance and accuracy of the speech recognition systems for a specific pilot or co-pilot and reducing the processing and memory requirements for training models.

The terms "speech recognition system" and "voice recognition system" are used interchangeably herein. The following discussion is directed to the pilot, although the method is applicable, in the same manner, to the co-pilot as is understood by one skilled in the art upon reading and understanding this document. The pilot is also referred to herein as a user. Cockpits systems, as used herein, refers to the hardware, software, and processing capability required for the aircraft to fly safely. The term "speaker-independent speech recognition system onboard the aircraft", as used herein, refers to the a speech recognition system onboard the aircraft that has not required the costly, time-intensive, offline training for every pilot and co-pilot. The term "speaker-independent speech recognition system onboard the aircraft" is also referred to herein as "cockpit speech recognition system". The cockpit speech recognition system includes a pilot acoustic feature model that is upgraded by the use of the COD as described herein. A "speech enabled cockpit system", as defined herein, is a cockpit system that includes a "speaker-independent speech recognition system onboard the aircraft".

Figure 1:
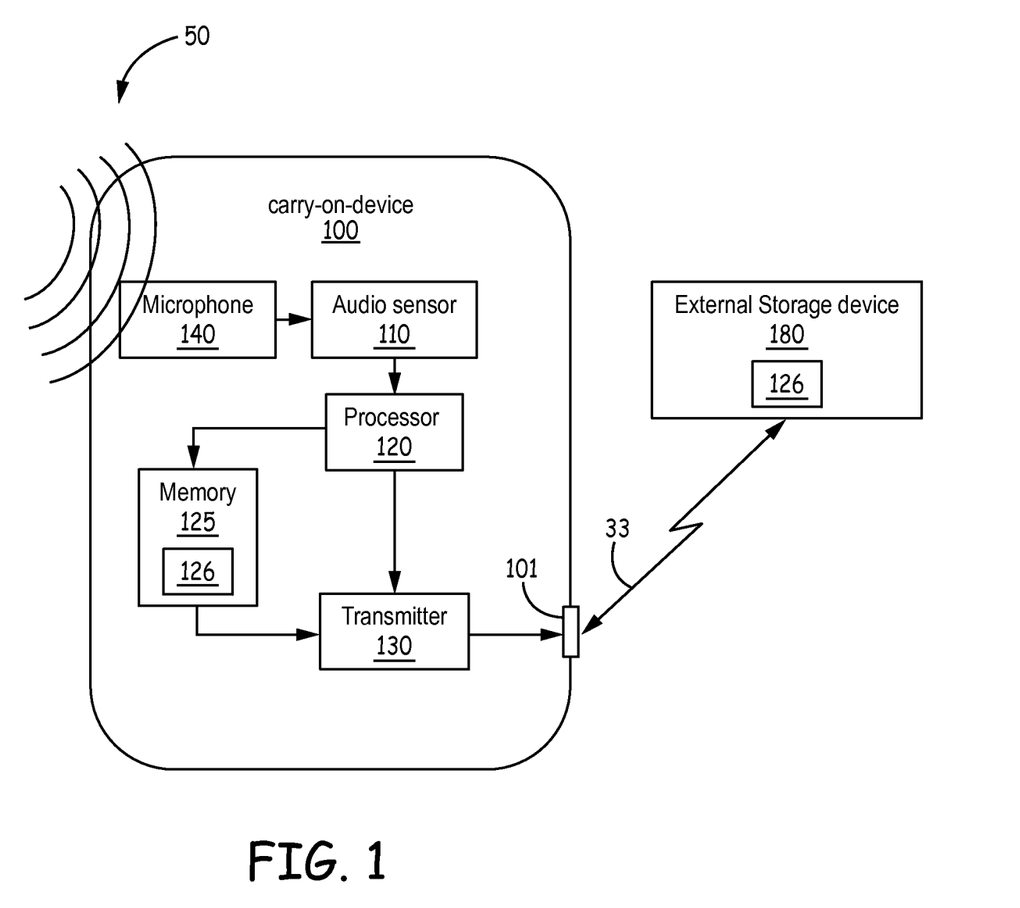
FIG. 1 shows an embodiment of a carry-on-device communicatively coupled to an external storage device in accordance with the present application.

FIG. 1 shows an embodiment of a carry-on-device communicatively coupled to an external storage device in accordance with the present application. The carry-on-device 100 includes an audio sensor 110, at least one processor 120, a memory 125, a transmitter 130, a microphone 140, and an interface 101.

Figure 2A:
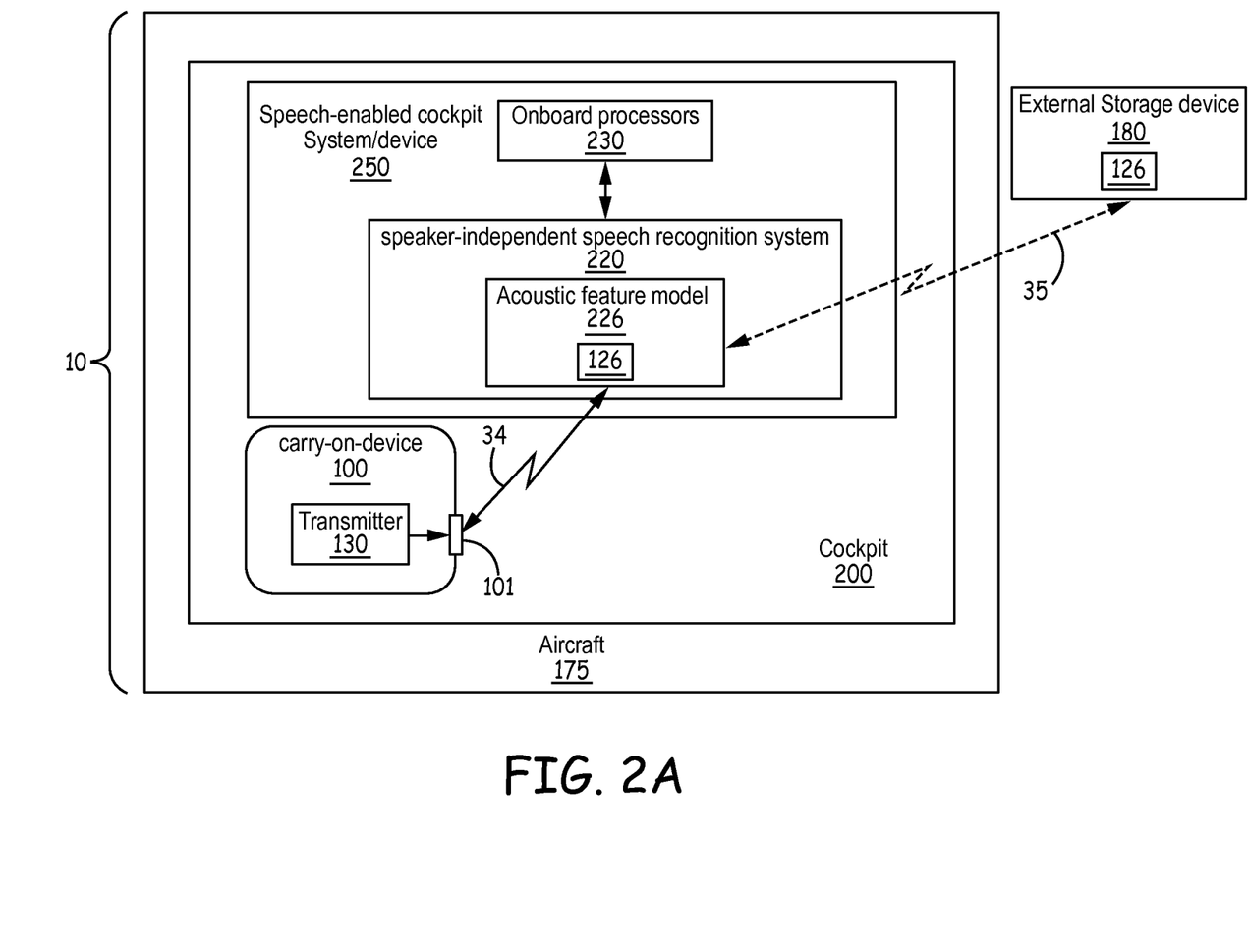
FIGS. 2A and 2B show embodiments of the carry-on-device of FIG. 1 communicatively coupled to a speaker-independent speech recognition system in a cockpit of an aircraft in accordance with the present application.
Figure 2B:
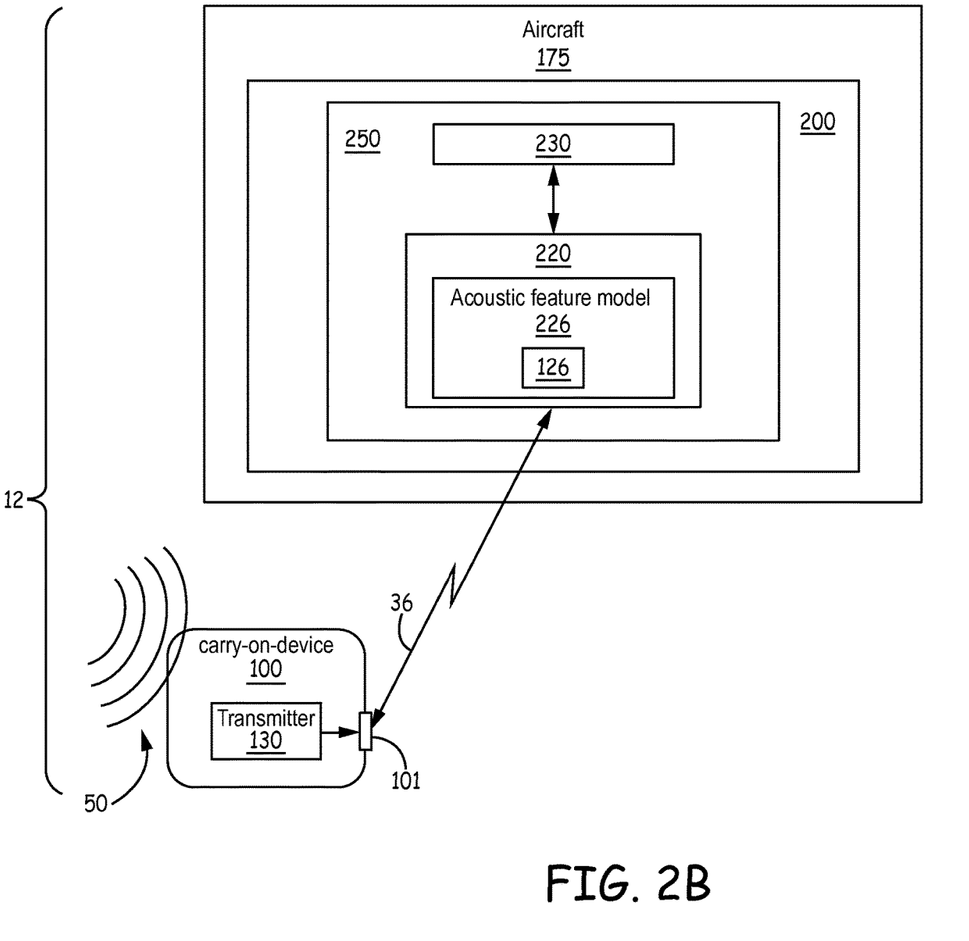

FIGS. 2A and 2B show embodiments of the carry-on-device of FIG. 1 communicatively coupled to a speaker-independent speech recognition system 220 in a cockpit 200 of an aircraft 175 in accordance with the present application.

FIG. 2A shows an embodiment of the carry-on-device of FIG. 1 inside the cockpit 200 of the aircraft 175 and communicatively coupled to the speaker-independent speech recognition system 220 in the cockpit 200 of the aircraft 175. The carry-on-device 100, the external storage device 180, and a speech-enabled-cockpit system/device 250 form a system 10 for recognizing speech of a user in the aircraft 175 with reduced latency and reduced training. In one implementation of this embodiment, the system 10 includes the carry-on-device 100 and the speech-enabled-cockpit system/device 250 and there is no external storage device 180.

FIG. 2B shows an embodiment of the carry-on-device 100 of FIG. 1 outside the aircraft 175 and communicatively coupled to the speaker-independent speech recognition system in the cockpit 200 of the aircraft 175. The carry-on-device 100 and the speech-enabled-cockpit system/device 250 form a system 12 for recognizing speech of a user in the aircraft 175 with reduced latency and reduced training. In one implementation of this embodiment, system 12 includes the external storage device 180 shown in FIGS. 1 and 2A.

The speech-enabled-cockpit system/device 250 includes the onboard processors 230 and the speaker-independent speech recognition system 220 as well as any other hardware and software required to implement the speaker-independent speech recognition system 220. The speaker-independent speech recognition system 220 includes an acoustic feature model 226.

Figure 3:
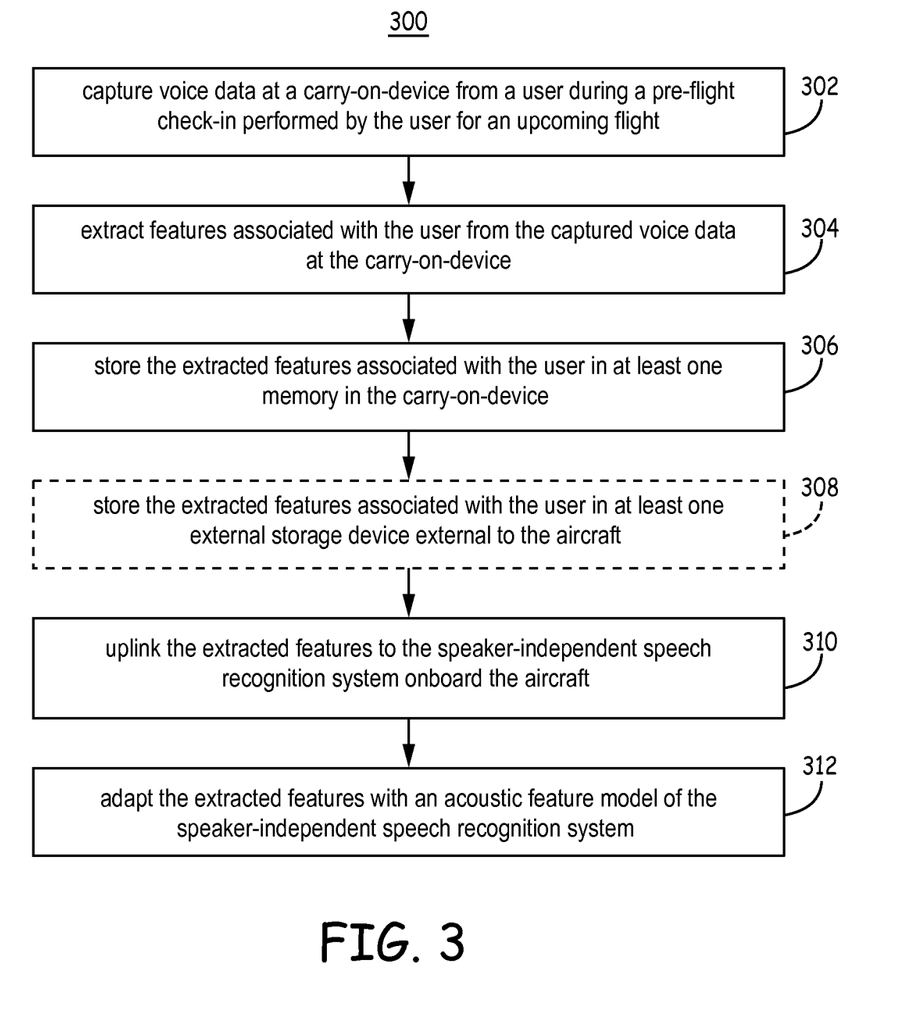
FIG. 3 shows an embodiment of a method of implementing a speaker-independent speech recognition system with reduced latency.

FIG. 3 shows an embodiment of a method 300 of implementing a speaker-independent speech recognition system with reduced latency. Method 300 is described with reference to the carry-on-device 100 for use in the system 10 or 12 as shown in FIG. 2A or 2B, respectively. The carry-on-device 100 shown in FIG. 1 implements a speaker-independent speech recognition system 220 with reduced latency as described with reference to FIGS. 2A, 2B, and 3.

At block 302, voice data is captured at a carry-on-device 100 from the user during a pre-flight check-in performed by the user for an upcoming flight. The voice data is captured at a carry-on-device 100 from the user while the user is not inside the aircraft being prepared for the upcoming flight. The pilot has to do some basic checks and mandatory checks before leaving the gate to take off. The pilot is free to record his speech during the pre-flight check-in anytime and anywhere and not necessarily just during the briefing stage. For example, the pilot can record his speech during the pre-flight check-in in a quiet environment several hours before the upcoming flight.

The audio sensor 110 is configured to capture voice data from a user during a pre-flight check-in performed by the user for an up-coming flight. The voice data is embedded in the acoustic waves 50 that are shown in FIG. 1 to impinge on the microphone 140 in the carry-on-device 100. The microphone 140 generates signals from the acoustic waves 50. The signals are sent from the microphone 140 to the audio sensor 110. In one implementation of this embodiment, the audio sensor 110 is integrated with the microphone 140. One or more audio files of the signals generated from the acoustic waves 50 are also stored in memory 125 to assist in collecting live speech corpus to improve the speech recognition system.

At block 304, features 126 associated with the user are extracted from the captured voice data at the carry-on-device 100. At least one processor 120 (FIG. 1) is configured to extract features from the captured voice data. At block 306, the extracted features 126 associated with the user are stored in at least one memory 125 in the carry-on-device 100.

The process implemented at block 308 is optional. At block 308, the extracted features 126 associated with the user are stored in at least one external storage device 180 external to the aircraft 175. The extracted features 126 are transmitted from the processor 120 to the transmitter 130. The transmitter 130 is communicatively coupled to the external storage device 180 via the interface 106 on the carry-on-device 105 and the wireless communication link 33.

At block 310, the extracted features 126 are uplinked to the speaker-independent speech recognition system 220 onboard the aircraft 175. In the embodiment of FIG. 2A, the extracted features 126 are uplinked to the speaker-independent speech recognition system 220 when the user enters a cockpit 200 of an aircraft 175 for the upcoming flight. The transmitter 130 uplinks the extracted features 126 to the speaker-independent speech recognition system 220 onboard the aircraft 175 via the interface 101 and the wireless communication link 34. In one implementation of this embodiment, the carry-on-device 100 is a hardwire connected from the interface 101 to an interface in the speaker-independent speech recognition system 200. As shown in FIG. 2A, the speaker-independent speech recognition system 220 is optionally configured to send the extracted features 126 to an external storage device 180 via communication link 35.

In the embodiment shown in FIG. 2B, the extracted features 126 are uplinked to the speaker-independent speech recognition system 220 onboard the aircraft 175 while the pilot is positioned outside the aircraft 175. In this case, the carry-on-device 100 has a wireless connection 36 to the aircraft 175 to uplink the extracted features 126 while or after the pilot speaks commands to the carry-on-device 100 during a pre-flight check-in for an upcoming flight. In one implementation of this embodiment of system 12, the carry-on-device 100 also sends the extracted features 126 to the external storage device 180 via communication link 33, as shown in FIG. 1. The pilot's workload, upon entering the cockpit 200 prior to takeoff, is reduced by the use of the carry-on-device 100 since the checks are done with the list of voice commands, which were used in training and were sent to the speech-enabled-cockpit system/device 250 either when the pilot entered the cockpit 200 (FIG. 2A) or before the pilot entered the cockpit 200 (FIG. 2B).

At block 312, the extracted features 126 are adapted with an acoustic feature model 226 of the speaker-independent speech recognition system 220 based on the uplinking of the extracted features 126 to the speaker-independent speech recognition system 220. In one implementation of this embodiment, the extracted features 126 are adapted with an acoustic feature model 226 of the speaker-independent speech recognition system 220 by inputting at least one of the extracted features 126 to at least one portion of the acoustic feature model 226 of the speaker-independent speech recognition system 220. In another implementation of this embodiment, the extracted features 126 are adapted with an acoustic feature model 226 of the speaker-independent speech recognition system 220 by linking at least one of the extracted features 126 to at least one portion of the acoustic feature model 226 of the speaker-independent speech recognition system 220. In yet another implementation of this embodiment, the extracted features 126 are adapted with an acoustic feature model 226 of the speaker-independent speech recognition system 220 by overlaying at least a portion of the acoustic feature model 226 of the speaker-independent speech recognition system 220 with at least one of the extracted features 126.

Thus, method 300 and systems 10 and 12 boost the accuracy of speaker independent speech recognition system 220 by adapting the speaker independent speech recognition system with a specific user voice. As described above, the adaptation occurs based on capturing voice data at the carry-on-device 100 from a user (e.g., pilot/copilot) during a pre-flight check-in for an upcoming flight performed by the user. The speech acoustic model adaptation (also referred to herein as pre-flight-check-in training) is done on the ground away from the noise of the aircraft 175 in the cockpit 200. Since there is relatively little noise in the voice data captured away from the aircraft 175, the adaptation is based on good voice data that is specific to the user's voice.

Once the acoustic model training for use in adapting the is done (i.e., block 312 is completed), the voice data is synced to the voice enabled cockpit system. In this manner, the voice commands are activated as the pilot enters the cockpit 200 and the carry-on-device 100 is automatically synced with cockpit speaker-independent speech recognition system 220. The audio files generated by the pilot's commands and stored in memory 124 of the carry-on-device 100 are converted to textual commands. The onboard systems of the speech-enabled-cockpit system/device 250 are activated sequentially according to the order of voice command spoken by the pilot into the carry-on-device 100 while outside the aircraft 175. In this manner, the recorded voice messages (audio files) are secured in the carry-on-device 100 and as well in the speech-enabled-cockpit system/device 250 to enable a system for the interactive checklist action to function. This also ensures there is no checklist item missed or overlooked either intentionally or accidentally in cockpit.

In one implementation of this embodiment, the cockpit systems used during the flight are configured to use at least a portion of the processing power and memory in the carry-on-device 100 to assist in the training the speech recognition system for pilots and co-pilots voice. In this case, the onboard processors 230 are communicatively coupled to the processor 120 in the carry-on-device 100 to exchange data. This reduces the processing load on the onboard processors 230 and improves the overall processing speed of the systems 10 and 12. In another implementation of this embodiment, the carry-on-device 100 is configured to remotely command certain operation in the cockpit 200.

Method 300 and system 10 and 12 also prevent additional latency and conveniently allow the pilot to perform certain tasks remotely through speech commands to cockpit 200 via the carry-on-device 100. The speech-enabled-cockpit system/device 250, which uses the speaker-independent speech recognition system 220, is adapted to the pilot's voice based on the pilot remotely recording the audio of the pre-flight check-in for an upcoming flight. In this manner, the speaker-independent speech recognition system 220 substantiates the speech recognition system and provides greater accuracy for the pilot, who is about to command the cockpit system through speech during the flight.

The systems 10 and 12 are configured to the pilot on the pilot's side of the cockpit 200 and the co-pilot on the co-pilot's side in the cockpit 200 for the current flight to help the voice recognition system to clearly identify the pilot and co-pilots commands during the flight even though the commands may be obscured by other voices and other external noises. This process of capturing voice data and extracting extracted features 126 leverages speaker identification and speaker verification technology to pick up the right speech recognition models for higher confidence and speech accuracy for the trained voices. The cockpit based speaker-independent speech recognition system responds only to the trained voices as an extra security measure.

The speech-enabled-cockpit system/device 250 approves the voice message through stringent security systems so that malfunction of the pilot voice is reduced. This is achieved by providing a recording feature in the carry-on-device 100 and leveraging speech identification and verification technology within the speech-enabled-cockpit system/device 250 in the cockpit 200. With the help of speaker identification and speaker verification technology, an intrusion or commanding through by an unwanted individual is prevented.

Figure 4:
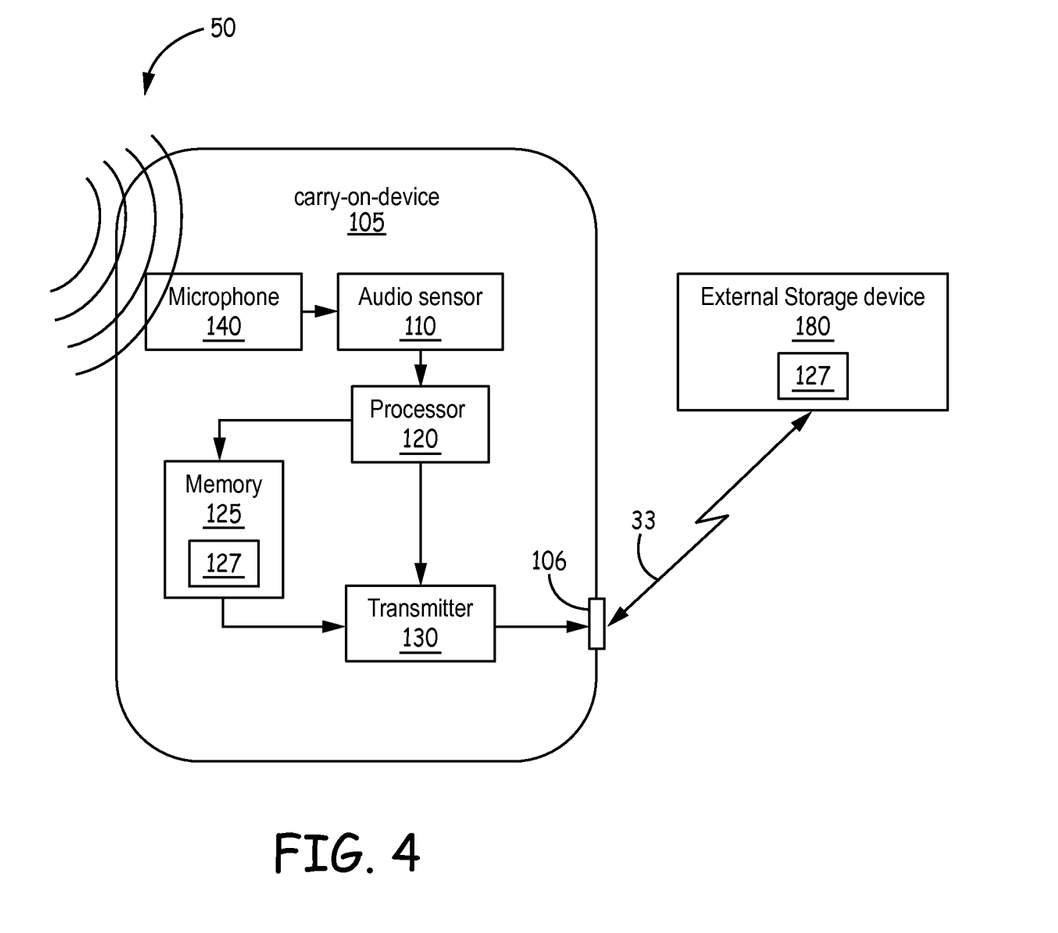
FIG. 4 shows an embodiment of a carry-on-device communicatively coupled to an external storage device in accordance with the present application.
Figure 5:
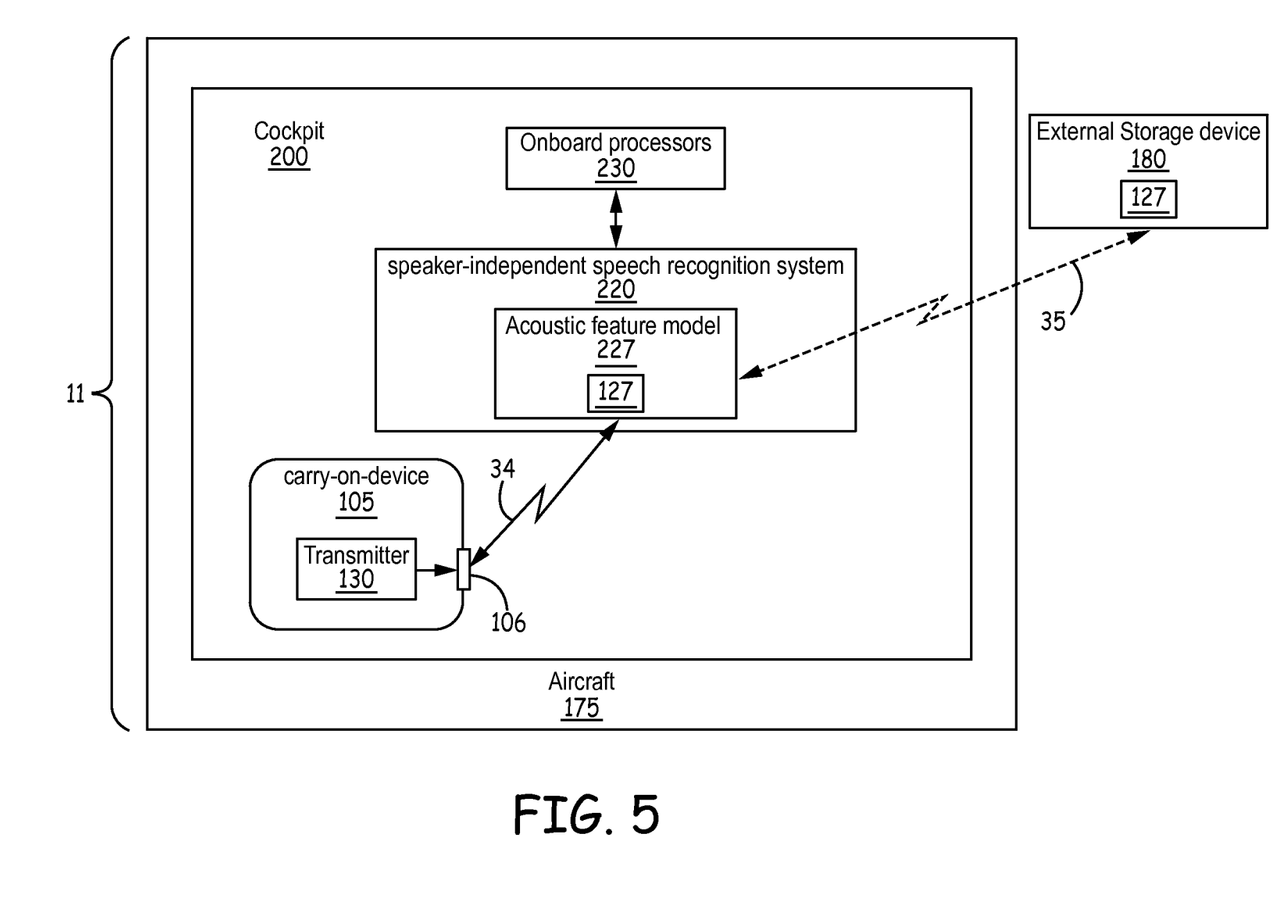
FIG. 5 shows an embodiment of the carry-on-device of FIG. 4 communicatively coupled to a speaker-independent speech recognition system in a cockpit of an aircraft in accordance with the present application.

FIG. 4 shows an embodiment of a carry-on-device 105 communicatively coupled to an external storage device 180 in accordance with the present application. FIG. 5 shows an embodiment of the carry-on-device 105 of FIG. 4 communicatively coupled to a speaker-independent speech recognition system 220 in a cockpit 200 of an aircraft 175 in accordance with the present application. The carry-on-device 105, the external storage device 180, and the speaker-independent speech recognition system 220 and at least one onboard processor 230 in the cockpit 200 of the aircraft 175 comprise a system 11 for recognizing speech of a user in an aircraft 175 with reduced latency and reduced training. The system 11 differs from system 10 of FIG. 2A and system 12 of FIG. 2B in that system 11 provides encryption of the extracted features.

The carry-on-device 105 in FIGS. 4 and 5 differs from the carry-on-device 100 in FIGS. 1 and 2A, in that the extracted features 126 in FIGS. 1 and 2A are encrypted by the processor 120 before saving in the memory 125 as encrypted extracted features 127. As shown in FIGS. 4 and 5 the encrypted extracted features 127 are stored in the external storage device 180. As shown in FIG. 4, the encrypted extracted features 127 are adapted with the acoustic feature model 227 of the speaker-independent speech recognition system 220 in a system 11. Other than these changes, the function and structure of the carry-on-device 105 implemented in the system 11 for recognizing speech of a user in an aircraft 175 without offline speech training of the user speaker-independent speech recognition system 220 in the same as the function and structure of the carry-on-device 100 implemented in the system 10 (FIG. 2A) for recognizing speech of a user in an aircraft 175 without offline speech training of the user speaker-independent speech recognition system 220. System 12 can be configured to encrypt the extracted features as is understandable to one skilled in the art upon reading and understanding this document.

The systems 10-12 can be configured to store one or a plurality of extracted features 126 or 127 for a single user and to updated them as the user provide voice data at a carry-on-device 100 from a user during a pre-flight check-in performed by the user for a plurality of upcoming flights. The at least one onboard processor 230 in the cockpit 200 is optionally configured to request a download from the at least one external storage device 180 external to the aircraft 175 via communication link 35 as shown in FIG. 2A. In this case, the onboard processor 230 downloads stored-extracted features 126 associated with the user previously stored in the at least one external storage device 180 and compares the stored-extracted features 126 associated with the user to previously stored in the at least one external storage device 180 with the current-extracted features 126 associated with the user.

Table 1 shows exemplary information indicative of stored-extracted features (i.e., b, c, d, and g) and exemplary information indicative of current-extracted features (i.e., a, c, e, and g). The first feature is a specific type of feature associated with the voice data. Likewise, the second, third and fourth features are other specific types of features associated with the voice data. A processor (e.g., processor 120 or 230) compares like types of features. Specifically, the first type of current-extracted feature associated with the user is compared with the first type of stored-extracted features associated with the user. For the exemplary features shown in Table 1, if the absolute value of (b-a), (d-c), (f-e), and/or (h-g) exceeds the extracted-feature-difference threshold, then the processor triggers a storage of the current-extracted features associated with the user as a second set of extracted features associated with the user in the at least one external storage device 180. If the absolute value of (b-a), (d-c), (f-e), and/or (h-g) is less than the extracted-feature-difference threshold, then the processor triggers an updating of stored-extracted features previously stored in the at least one external storage device 180 based on the current uplinking of extracted features to the speaker-independent speech recognition system onboard the aircraft.

TABLE 1

| | current-extracted features (second extracted features) associated with user 1 | stored-extracted features (first extracted features) associated with user 1 |
|---|---|---|
| 1st feature | a | b |
| 2nd feature | c | d |
| 3rd feature | e | f |
| 4th feature | g | h |

The ability to store a plurality of extracted features 126 or 127 for a single user is advantageous if the user (pilot) has any type of throat condition (e.g., an illness such as a cold) on a particular day that changes the his/her voice. In that case, the system generates extracted features for the condition-modified voice and adapts the extracted features with an acoustic feature model of the speaker-independent speech recognition system for that upcoming flight after it has been confirmed the voice is actually that of the correct pilot. In one implementation of this embodiment, the modified acoustic feature model of the speaker-independent speech recognition system 220 is saved as an alternate acoustic feature model of the speaker-independent speech recognition system 220, which is used only when the voice of the pilot is affected by the throat illness or throat issue. An exemplary case is described with reference to a first flight, when the pilot's voice is normal, and a second flight, when the pilot's voice may be affected by a throat condition that changes the voice.

When the pilot's voice is normal (i.e., typical for the pilot), first voice data is captured at the carry-on-device 100 from the user during a first pre-flight check-in performed by the user for a first upcoming flight. First features associated with the user are extracted from the first captured voice data at the carry-on-device 100. The first extracted features 126 are uplinked to the speaker-independent speech recognition system 220 onboard the first aircraft 175 prior to the first upcoming flight. The first extracted features 126 are adapted with the acoustic feature model 226 of the speaker-independent speech recognition system 220 in the first aircraft 175. The first extracted features 126 associated with the user are stored in at least one memory 125 in the carry-on-device 100 prior to capturing the second voice data at the carry-on-device 100 from the user during the second pre-flight check-in performed by the user for the second upcoming flight.

Later, when the pilot's voice is affected by a throat condition that changes the pilot's voice, second features associated with the user are extracted from the second captured voice data at the carry-on-device 100 as the pilot prepares for a second flight. When the user enters a second cockpit 200 of a second aircraft 175 for the second upcoming flight, the second extracted features 126 are uplinked to the speaker-independent speech recognition system 220 onboard the second aircraft 175. The second extracted features 126 are adapted with the acoustic feature model 226 of the speaker-independent speech recognition system 220 in the second aircraft 175. The second extracted features 126 associated with the user in the at least one memory 125 in the carry-on-device 100.

The differences between the first extracted features 126 and the second extracted features 126 are compared at the carry-on-device 100. In one implementation of this embodiment, the differences between the first extracted features 126 and the second extracted features 126 are compared at the external storage device 180. If the differences between the first extracted features 126 and the second extracted features 126 are less than an extracted-feature-difference threshold, the stored first extracted features 126 are updated based on the stored second extracted features 126 in one or both of the memory 125 in the carry-on-device 100 and the external storage device 180. In one implementation of this embodiment, if differences between the first extracted features 126 and the second extracted features 126 exceed the extracted-feature-difference threshold, the second extracted features 126 associated with the user are stored as a second set of extracted features 126 associated with the user in one or both of the memory 125 in the carry-on-device 100 and the external storage device 180.

Processing devices described herein include or function with software programs, firmware or other computer readable instructions for carrying out various methods, process tasks, calculations, and control functions used in the communicatively coupled speech-enabled-cockpit system/device, external storage device, and carry-on-device.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EE- PROM), and flash memory, etc. Suitable processor-readable media may also include transmission media such as electrical, electromagnetic, or digital signals, conveyed via a communication medium such as a network and/or a wireless link.

EXAMPLE EMBODIMENTS

Example 1 includes a method for implementing a speaker-independent speech recognition system with reduced latency, the method comprising: capturing voice data at a carry-on-device from a user during a pre-flight check-in performed by the user for an upcoming flight; extracting features associated with the user from the captured voice data at the carry-on-device; uplinking the extracted features to the speaker-independent speech recognition system onboard the aircraft; and adapting the extracted features with an acoustic feature model of the speaker-independent speech recognition system.

Example 2 includes the method of Example 1, wherein adapting the extracted features with the acoustic feature model of the speaker-independent speech recognition system comprises one or more of: inputting at least one of the extracted features to at least one portion of the acoustic feature model of the speaker-independent speech recognition system; linking at least one of the extracted features to at least one portion of the acoustic feature model of the speaker-independent speech recognition system; and overlaying at least a portion of the acoustic feature model of the speaker-independent speech recognition system with at least one of the extracted features.

Example 3 includes the method of any of Examples 1-2, further comprising: storing the extracted features associated with the user in at least one memory in the carry-on-device.

Example 4 includes the method of Example 3, further comprising: deleting previously-extracted features when the extracted features are stored in the at least one memory in the carry-on-device.

Example 5 includes the method of any of Examples 3-4, further comprising: storing the extracted features associated with the user in at least one external storage device external to the aircraft.

Example 6 includes the method of Example 5, further comprising: updating stored-extracted features previously stored in at least one external storage device based on the current uplinking of the extracted features to the speaker-independent speech recognition system onboard the aircraft.

Example 7 includes the method of any of Examples 1-6, further comprising: encrypting the extracted features; and storing the encrypted extracted features associated with the user in at least one memory in the carry-on-device.

Example 8 includes the method of any of Examples 1-7, further comprising: encrypting the extracted features; and storing the encrypted extracted features associated with the user in at least one external storage device external to the aircraft.

Example 9 includes the method of any of Examples 1-8, wherein capturing the voice data at the carry-on-device from the user during the pre-flight check-in comprises capturing first voice data at the carry-on-device from the user during a first pre-flight check-in performed by the user for a first upcoming flight; and wherein extracting the features associated with the user from the captured voice data at the carry-on-device further comprises extracting first features associated with the user from the first captured voice data at the carry-on-device, wherein uplinking the extracted features to the speaker-independent speech recognition system onboard the aircraft comprises, uplinking the first extracted features to the speaker-independent speech recognition system onboard the first aircraft prior to the first upcoming flight; and wherein adapting the extracted features with the acoustic feature model of the speaker-independent speech recognition system comprises adapting the first extracted features with the acoustic feature model of the speaker-independent speech recognition system in the first aircraft.

Example 10 includes the method of Example 9, wherein capturing the voice data at the carry-on-device from the user during the pre-flight check-in further comprises capturing second voice data at the carry-on-device from the user during a second pre-flight check-in performed by the user for a second upcoming flight scheduled to take place after a first flight is completed; and wherein extracting the features associated with the user from the captured voice data at the carry-on-device further comprises extracting second features associated with the user from the second captured voice data at the carry-on-device; wherein uplinking the extracted features to the speaker-independent speech recognition system onboard the second aircraft further comprises, uplinking the second extracted features to the speaker-independent speech recognition system onboard the second aircraft prior to the second upcoming flight; and wherein adapting the extracted features with the acoustic feature model of the speaker-independent speech recognition system comprises adapting the second extracted features with the acoustic feature model of the speaker-independent speech recognition system in the second aircraft.

Example 11 includes the method of Example 10, further comprising: storing the first extracted features associated with the user in at least one memory in the carry-on-device prior to capturing the second voice data at the carry-on-device from the user during the second pre-flight check-in performed by the user for the second upcoming flight; and storing the second extracted features associated with the user in the at least one memory in the carry-on-device.

Example 12 includes the method of Example 11, further comprising: determining if differences between the first extracted features and the second extracted features are less than an extracted-feature-difference threshold; if differences between the first extracted features and the second extracted features are less than an extracted-feature-difference threshold, the method further comprises: updating the stored first extracted features based on the stored second extracted features; and if differences between the first extracted features and the second extracted features exceed the extracted-feature-difference threshold, the method further comprises: storing the second extracted features associated with the user as a second set of extracted features associated with the user in the at least one external storage device.

Example 13 includes the method of any of Examples 10-12 further comprising: storing the first extracted features associated with the user in at least one external storage device external to the first aircraft based on uplinking the first extracted features to the speaker-independent speech recognition system onboard the first aircraft; storing the second extracted features associated with the user in at least one external storage device external to the second aircraft based on uplinking the second extracted features to the speaker-independent speech recognition system onboard the first aircraft; determining if differences between the first extracted features and the second extracted features are less than an extracted-feature-difference threshold; if differences between the first extracted features and the second extracted features are less than an extracted-feature-difference threshold, the method further comprises: updating the stored first extracted features based on the stored second extracted features; and if differences between the first extracted features and the second extracted features exceed the extracted-feature-difference threshold, the method further comprises: storing the second extracted features associated with the user as a second set of extracted features associated with the user in the at least one external storage device.

Example 14 includes a carry-on-device for implementing a speaker-independent speech recognition system with reduced latency, the method comprising: an audio sensor configured to capture voice data from a user during a pre-flight check-in performed by the user for an up-coming flight; at least one processor to extract features from the captured voice data; a memory to store the features extracted from the captured voice data; and a transmitter to uplink the extracted features to a speaker-independent speech recognition system onboard an aircraft, wherein the extracted features are adapted with an acoustic feature model of the speaker-independent speech recognition system based on the uplinking of the extracted features.

Example 15 includes the carry-on-device of Example 14, wherein the transmitter is further configured to uplink the extracted features to a storage device external to the aircraft.

Example 16 includes the carry-on-device of any of Examples 14-15, further comprising a microphone.

Example 17 includes the carry-on-device of any of Examples 14-16, wherein the processor is further configured to encrypt the features extracted from the captured voice data, and wherein the memory is further configured to store the encrypted extracted features.

Example 18 includes a system for recognizing speech of a user in an aircraft with reduced latency the system comprising: a speaker-independent speech recognition system stored for implementation in a cockpit of the aircraft; a carry-on-device comprising: an audio sensor configured to capture voice data from the user during a pre-flight check-in performed by the user for an upcoming flight; at least one processor to extract features from the captured voice data; a memory to store features extracted from the captured voice data at the carry-on-device; and a transmitter to uplink the extracted features to the speaker-independent speech recognition system onboard the aircraft, wherein the extracted features of the user are adapted with an acoustic feature model of the speaker-independent speech recognition system based on the uplinking of the extracted features.

Example 19 includes the system of Example 18, further comprising: at least one external storage device external to the aircraft for storage of the features extracted from the captured voice data of the user at the carry-on-device; at least one onboard processor in the cockpit configured to: request download from the at least one external storage device external to the aircraft of stored-extracted features associated with the user previously stored in the at least one external storage device; and comparing the stored-extracted features associated with the user to previously stored in the at least one external storage device with the current-extracted features associated with the user.

Example 20 includes the system of Example 19, wherein the at least one onboard processor in the cockpit is further configured to one of: update the stored-extracted features associated with the user previously stored in the at least one external storage device based on the current-extracted features associated with the user if differences between the current-extracted features and the stored-extracted features are less than or equal to an extracted-feature-difference threshold; and add the current-extracted features associated with the user to the at least one external storage device as a second set of extracted features associated with the user, if differences between the current-extracted features and the stored-extracted features exceed the extracted-feature-difference threshold.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for implementing a speaker-independent speech recognition system with reduced latency, the method comprising:
   capturing current voice data at a carry-on-device from a user during a pre-flight check-in performed by the user prior to boarding an aircraft;
   extracting current features associated with the user from the captured voice data at the carry-on-device;
   uplinking the extracted current features to the speaker-independent speech recognition system onboard the aircraft for use by the user on the aircraft;
   adapting the extracted current features with an acoustic feature model of the speaker-independent speech recognition system;
   determining if differences between the extracted current features and stored extracted features associated with the user are less than or equal to a threshold;
   if differences between the extracted current features and the stored extracted features are less than or equal to the threshold, updating the stored extracted features based on the extracted current features; and
   if differences between the extracted current features and the stored extracted features exceed the threshold, storing the extracted current features as a second set of extracted features associated with the user.

2. The method of claim 1, wherein adapting the extracted current features with the acoustic feature model of the speaker-independent speech recognition system comprises one or more of:
   inputting at least one of the extracted current features to at least one portion of the acoustic feature model of the speaker-independent speech recognition system;
   linking at least one of the extracted current features to at least one portion of the acoustic feature model of the speaker-independent speech recognition system; and
   overlaying at least a portion of the acoustic feature model of the speaker-independent speech recognition system with at least one of the extracted current features.

3. The method of claim 1, further comprising:
   storing the extracted current features associated with the user in at least one memory in the carry-on-device.

4. The method of claim 3, further comprising:
   deleting previously-stored extracted features when the extracted current features are stored in the at least one memory in the carry-on-device.

5. The method of claim 3, further comprising:
   storing the extracted current features associated with the user in at least one external storage device external to the aircraft.

6. The method of claim 5, further comprising:
   updating stored extracted features previously stored in at least one external storage device based on the current uplinking of the extracted current features to the speaker-independent speech recognition system onboard the aircraft.

7. The method of claim 1, further comprising:
encrypting the extracted current features; and
storing the encrypted extracted current features associated with the user in at least one memory in the carry-on-device.

8. The method of claim 1, further comprising:
encrypting the extracted current features; and
storing the encrypted extracted current features associated with the user in at least one external storage device external to the aircraft.

9. The method of claim 1, wherein the stored extracted features are first extracted features and prior to capturing the current voice data, the method further comprises:
capturing first voice data at the carry-on-device from the user during a first pre-flight check-in performed by the user for a first upcoming flight on a first aircraft;
extracting first features associated with the user from the first captured voice data at the carry-on-device,
uplinking the first extracted features to the speaker-independent speech recognition system onboard the first aircraft prior to the first upcoming flight;
adapting the first extracted features with the acoustic feature model of the speaker-independent speech recognition system in the first aircraft; and
storing the first extracted features associated with the user.

10. The method of claim 9, wherein the current voice data is second voice data and the extracted current features are second extracted features, the method further comprises:
capturing second voice data at the carry-on-device from the user during a second pre-flight check-in performed by the user for a second upcoming flight scheduled to take place after a first flight is completed; and
extracting second features associated with the user from the second captured voice data at the carry-on-device;
uplinking the second extracted features to the speaker-independent speech recognition system onboard the second aircraft prior to the second upcoming flight; and
adapting the second extracted features with the acoustic feature model of the speaker-independent speech recognition system in the second aircraft.

11. The method of claim 10, further comprising:
storing the first extracted features associated with the user in at least one memory in the carry-on-device; and
storing the second extracted features associated with the user in the at least one memory in the carry-on-device.

12. The method of claim 10 further comprising:
storing the first extracted features associated with the user in at least one external storage device external to the first aircraft based on uplinking the first extracted features to the speaker-independent speech recognition system onboard the first aircraft;
storing the second extracted features associated with the user in at least one external storage device external to the second aircraft based on uplinking the second extracted features to the speaker-independent speech recognition system onboard the first aircraft.

13. A system for recognizing speech of a user in an aircraft with reduced latency the system comprising:
a speaker-independent speech recognition system for implementation onboard the aircraft including an acoustic feature model;
a carry-on-device comprising:
an audio sensor configured to capture current voice data from the user during a pre-flight check-in performed by the user prior to boarding the aircraft;
at least one processor to extract current features from the captured voice data;
a memory to store features extracted from the captured voice data at the carry-on-device; and
a transmitter to uplink the extracted current features to the speaker-independent speech recognition system, for use by the user, onboard the aircraft;
wherein the speaker-independent recognition system is configured to adapt the extracted current features of the user with the acoustic feature model based on the uplinking of the extracted features;
at least one onboard processor in the cockpit configured to compare the extracted current features with stored extracted features;
if differences between the extracted current features and the stored extracted features are less than or equal to a threshold, update the stored extracted features based on the extracted current features; and
if differences between the extracted current features and the stored extracted features exceed the threshold, store the extracted current features as a second set of extracted features associated with the user.

14. The system of claim 13, further comprising:
at least one external storage device external to the aircraft for storage of features extracted from captured voice data of the user at the carry-on-device;
wherein the at least one onboard processor is further configured to:
request download from the at least one external storage device of the stored extracted features associated with the user previously stored in the at least one external storage device prior to comparing the extracted current features with the stored extracted features.

15. The system of claim 14, wherein the at least one onboard processor is further configured to one of:
update the stored extracted features associated with the user previously stored in the at least one external storage device based on the extracted current features associated with the user if differences between the current features and the stored extracted features are less than or equal to an extracted-feature-difference threshold; and
add the current features associated with the user to the at least one external storage device as a second set of extracted features associated with the user, if differences between the current features and the stored extracted features exceed the extracted-feature-difference threshold.

16. A method for implementing a speaker-independent speech recognition system with reduced latency, the method comprising:
receiving, by at least one processor onboard a current aircraft, extracted current features associated with a user from captured current voice data from a device associated with the user;
adapting, by the at least one processor, the extracted current features with an acoustic feature model;
comparing, by the at least one processor, the extracted current features to stored extracted features associated with the user;
if differences between the extracted current features and the stored extracted features are less than or equal to a threshold, updating, by the at least one processor, the stored extracted features based on the extracted current features; and
if differences between the extracted current features and the stored extracted features exceed the threshold, storing, by the at least one processor, the extracted current features as a second set of extracted features associated with the user.

17. The method of claim 16, wherein adapting, by the at least one processor, the extracted current features with the acoustic feature model comprises one or more of:
   inputting, by the at least one processor, at least one of the extracted current features to at least one portion of the acoustic feature model;
   linking, by the at least one processor, at least one of the extracted current features to at least one portion of the acoustic feature model; and
   overlaying, by the at least one processor, at least a portion of the acoustic feature model with at least one of the extracted current features.

18. The method of claim 16, wherein the stored extracted features are first extracted features and prior to receiving the extracted current features, the method further comprises:
   receiving, by at least one first processor onboard a first aircraft, the first extracted features associated with the user from first captured voice data from the device associated with the user;
   adapting, by the at least one first processor, the first extracted features with the acoustic feature model; and
   storing, by the at least one first processor, the first extracted features associated with the user.

19. The method of claim 18, wherein the at least one processor onboard the current aircraft is at least one second processor onboard a second aircraft and the extracted current features are second extracted features, the method further comprises:
   receiving, by at least one second processor, second extracted features associated with the user from second captured voice data from the device associated with the user; and
   adapting, by the at least one second processor, the second extracted features with the acoustic feature model.

20. The method of claim 19, further comprising:
   storing, by the at least one first processor, the first extracted features in at least one external storage device external to the first aircraft; and
   storing, by the at least one second processor, the second extracted features in the at least one external storage device external to the second aircraft.

* * * * *